United States Patent [19]

Watts

[11] 3,855,358

[45] Dec. 17, 1974

[54] PVC-HEXACHLOROCYCLOPENTADIENE/-CYCLIC OLEFIN COPOLYMER RESIN BLENDS

[75] Inventor: William A. Watts, Akron, Ohio

[73] Assignee: The Goodyear Tire & Rubber Company, Akron, Ohio

[22] Filed: Oct. 17, 1973

[21] Appl. No.: 407,350

[52] U.S. Cl........ 260/899, 260/30.4 A, 260/87.5 R, 260/897 C, 260/890
[51] Int. Cl. .......................................... C08f 29/24
[58] Field of Search ............................ 260/899, 890

[56] References Cited
UNITED STATES PATENTS
3,158,664  11/1964  Baer.................................. 260/888

Primary Examiner—Murray Tillman
Assistant Examiner—C. J. Seccuro
Attorney, Agent, or Firm—F. W. Brunner; J. Y. Clowney

[57] ABSTRACT

Polyvinyl chloride resin, film, sheet, and molded articles thereof containing the copolymers of (A) an adduct of hexachlorocyclopentadiene and a cyclic olefin containing two or more double bonds copolymerized with (B) certain cyclic olefins or cyclicdiolefins and cyclictriolefins in amounts sufficient to cause favorable modification of tear and impact strength of the resultant end products.

11 Claims, No Drawings

PVC-HEXACHLOROCYCLOPENTADIENE/CYCLIC OLEFIN COPOLYMER RESIN BLENDS

This invention relates to vinyl resin, particularly polyvinyl chloride resin, both homopolymer and copolymer types, such as propylene/vinyl chloride, ethylene/vinyl chloride, vinylidene chloride/vinyl chloride, vinyl acetate/vinyl chloride, etc., hereinafter referred to as PVC, modified with the copolymers resulting from the polymerization of (A) an adduct of hexachlorocyclopentadiene and a cyclic olefin with two or more double bonds with (B) certain cyclic olefins, and products made thereof.

PVC film for encasement of objects is preferably transparent, has a low haze, resists tear and impact rupture, and meets the regulations of the Food and Drug Administration. Rigid PVC film is made by several processing techniques. One of these involves casting a solution of PVC onto a smooth surface and then drying the cast film. It is difficult to remove the solvent from the unplasticized PVC layer and to aid in the removal of the solvent, plasticizer is added. But since a rigid film is required, the plasticizer becomes an undesirable component of the film.

It has now been discovered that the cast polyvinyl chloride film can be easily dried and the above requirements can be met and the tear and impact resistance improved by adding to the polyvinyl chloride or a copolymer of vinyl chloride, a copolymer of (a) an adduct of hexachlorocyclopentadiene and a cyclic olefin with two or more double bonds copolymerized with (b) certain cyclic olefins, in amounts to cause favorable modification of the tear and impact strength of the resultant end products.

Representative examples of comonomer A are the mono adduct of hexachlorocyclopentadiene and 1,5-cyclooctadiene, the mono- and di-adduct of hexachlorocyclopentadiene and 1,5,9-cyclododecatriene, the mono adduct of hexachlorocyclopentadiene and norbornadiene, and the mono adduct of hexachlorocyclopentadiene and 1,3-cyclooctadiene.

Representative examples of comonomer B are cyclopentene, cyclooctene, cyclododecene, 1,5-cyclooctadiene and 1,5,9-cyclododecatriene.

According to the present invention, the copolymer composition, consisting of comonomers A and B, will be in the range of 5 to 95 percent by weight of comonomer A and preferably 20 to 90 percent by weight of comonomer A; however, the most preferred range is 30 to 80 percent by weight of comonomer A. These copolymers can be made in accordance with the well known techniques as disclosed, for example, in U.S. Pat. No. 3,634,374.

As a result of various investigations, it has been found that the incorporation of copolymer resins prepared from comonomers A and B into PVC resins can afford film, sheet and molded articles having improved tear and impact strength. Generally, it is necessary to incorporate conventional stabilizers and antioxidants to prevent degradation of both PVC and copolymer resins. In addition, various other optional materials may be added to the compositions of the present invention depending upon the intended use and nature thereof, such as, for example, plasticizers, slip and anti-block agents, lubricants, processing aids and fillers. The final polymer blend may be prepared by admixing the components thereof in any of the customary ways including mill rolling, extrusion blending, etc. The end products made from these compositions can be prepared using conventional processing techniques, such as, for example, extrusion, calendering, solution casting and various molding procedures.

Practical embodiments of the invention are discussed and illustrated in the following examples wherein the tear strength reported is the force required to propagate a tear, not to initiate a tear.

EXAMPLE I

A rigid PVC film for packaging applications is preferably transparent, has low haze, resists tear and impact rupture, and with some applications, must meet the regulations of the FDA, USDA and other regulatory bodies. In order to obtain desirable tear and impact resistance in PVC films, a polymer modifier is normally incorporated in PVC film during the mixing cycle. Representative examples currently used are, for example, acrylonitrilebutadiene-styrene polymers, nitrile polymers and copolymers, and acrylic polymers and copolymers. Rigid PVC film is made using conventional processing techniques such as extrusion, calendering and solution casting procedures. It has been discovered that copolymers resulting from the polymerization of comonomer A with comonomer B can be incorporated into PVC resins using normal procedures for milling, banbury, and solution mixing processing. The resultant mixture can be processed using extrusion, calendering and solution casting techniques to produce a clear, tear resistant film.

For example, looking at solution casting methods, a rigid PVC film is currently made by casting a modified solution of PVC onto a smooth surface and then drying the cast film. It is generally difficult and time consuming to remove completely the casting solvent from the unplasticized PVC film. Consequently, as an aid to removal of the solvent and to reduce drying times, plasticizers are generally added.

It has been discovered that cast rigid PVC film can be easily dried without the use of plasticizers and tear and impact resistance improved by the addition of copolymer resins resulting from the polymerization of comonomer A and B, without interferring with the rigidity of the film. When the term cyclicolefins or cycloolefins is used herein, it is meant to include cyclomonoolefins, cyclodiolefins and cyclotriolefins. More specifically, the copolymer resins preferred for modifying PVC are the copolymers of at least one cyclic olefin selected from the group consisting of cyclopentene, cyclooctene, cyclododecene, 1,5-cyclooctadiene and 1,5,9-cyclododecatriene with the mono adduct of hexachlorocyclopentadiene and 1,5-cyclooctadiene in which the adduct produces in the copolymer the following repeat unit:

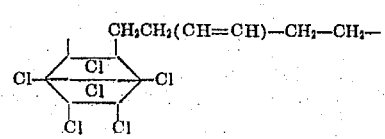

It has been observed, for example, that these copolymer resins are readily soluble in tetrahydrofuran at 120° and 125°F and form very tacky and tough films. It was then discovered that these copolymer resins can be added to PVC-solvent solutions and cast into a film and dried in a dynamic air oven at 170°F. for one hour. The following Table I illustrates one phase of the present invention, all parts being by weight percent.

TABLE I

| Examples | 1 | 2 | 3 | 4 | 5 |
|---|---|---|---|---|---|
| Homopolymer PVC Commercial | 100 | 90 | 95 | 95 | 95 |
| Acrylate Modifier | — | 10 | — | — | — |
| 80/20 HEX-COD/Cyclopentene* | — | — | 5 | — | — |
| 70/30 HEX-COD/Cyclopentene** | — | — | — | 5 | — |
| 85/15 HEX-COD/Cyclopentene*** | — | — | — | — | 5 |
| THF (Tetrahydrofuran) | 500 | 500 | 500 | 500 | 500 |
| Guage (mils) | 1.5 | 1.5 | 1.5 | 1.5 | 1.5 |
| Tear (g/mill) (Elmendorf) | 15.0 | 22.0 | 28.0 | 27.3 | 20.7 |
| Haze % | 0.6 | 2.7 | 1.0 | 0.6 | 1.6 |

*Copolymer of cyclopentene (20 parts) and 80 parts of the adduct of hexachlorocyclopentadiene and 1,5-cyclooctadiene
**Same as above except different ratio
***Same as above except different ratio Other physical properties such as, for example, tensile yield, tensile strength, elongation, heat seal, termal stability, oxygen and water vapor transmission, aging, slip and block are not affected by the addition of these copolymer resins. In addition, similar results have been obtained when using extrusion and calendering processes to obtain a clear, impact resistant PVC film.

From the above table, it will be appreciated that the incorporation of these copolymer resins at the most preferred amount into PVC results in a remarkable improvement in tear strength without undesirable haze content, whereas, other impact-resistant agents produce higher haze and lower tear values. In addition, after shelf-aging for one year, the films have no change in haze or tear values.

The compositions according to this part of the invention will consist of the following ranges, by weight percent:

| General % | 1-20) |
| | )copolymer resins consisting |
| Preferred % | 1-15) of comonomer A and B, as |
| | )previously illustrated |
| Most preferred % | 1-10) |

EXAMPLE II

In addition to being used in PVC to obtain a clear rigid, impact resistant PVC film, copolymer resins consisting of comonomers A and B as described in Example I have been used in PVC to produce a tough, flexible, translucent film. Results indicate that these copolymer resins have important usage as polymeric modifier-plasticizer agents for PVC since the resultant films are plasticizer free. This property produces benefits in the end-product because no plasticizers are present to exude and in time cause the product to embrittle let alone increase dirt pick-up.

For this application, the copolymer resins are used to replace monomeric plasticizers and/or commercial impact modifiers to obtain a high impact resistant film with low extractability. More specifically, for example, all copolymers of cyclopentene with the adduct of hexachlorocyclopentadiene and 1,5-cyclooctadiene have been compounded into PVC ranging in weight percent of 1 to 99. The preferred amount is 5 to 90 percent by weight and the most preferred amount is 15 to 50 percent by weight of copolymer resins in the PVC formulations. Using, for example, the 70/30 copolymer, a flexible, tough PVC film can be produced by solution casting, calendering and extrusion techniques having the following improved properties of tear and extractability resistance as shown in Table II, all parts by weight percent.

TABLE II

| Example | 1 | 2 | 3 |
|---|---|---|---|
| Homopolymer PVC | 100 | 79 | 70 |
| Monomeric plasticizer | — | 16 | — |
| Acrylate Modifier | — | 5 | — |
| 70/30 HEX-COD/cyclopentene* | — | — | 30 |
| Gauge, mils | 1.5 | 1.4 | 1.5 |
| Tear, g/mil (Elmendorf) | 15.0 | 40.0 | 60.0 |
| Total extractability % | <0.1 | 14.0 | <0.1 |
| Haze, % | 0.6 | 6.0 | 15.0 |

*Copolymer of cyclopentene (30 parts) and 70 parts of the adduct of hexachlorocyclopentadiene and 1,5-cyclooctadiene Other physical properties that are effected are very similar to those which conventional plasticizer-impact modifier materials produce.

EXAMPLE III

In addition to the above improvements obtained in PVC films, compositions containing PVC and varying amounts of copolymer resin, for example, 10–50 percent by weight, have been processed by first mill mixing and then press molding to produce molded articles which exhibit impact and puncture resistance. Although more work in checking out whether products can be processed by vacuum forming, rotational molding, injection molding, etc. is needed, it is very clear that these products will show improved impact and low extractability when compared with many of the current products just as was shown in Example II.

The use of copolymer resins as a modifier for PVC is an advance in the art for the production of improved PVC products since (1) a rigid film can be produced with improved tear and impact properties in a more economical manner because fewer parts of modifier are needed to obtain equal or better tear. In addition, the use of these copolymer resins eliminates the use of platicizers required in most conventional PVC formulations which again reduces the cost, and (2) a flexible, tough, low extractable PVC film can be produced with improved tear and impact properties when compared to conventional PVC films. In addition, the elimination of plasticizers becomes an ecological advantage since no plasticizers are present to exude to the surface; and (3) molding articles can be produced with the same advantage as in above number (2) using conventional molding techniques to obtain products of improved impact and low extractability.

While certain representative embodiments and details have been shown for the purpose of illustrating the invention, it will be apparent to those skilled in this art that various changes and modifications may be made therein without departing from the spirit or scope of the invention.

What is claimed is:

1. Polyvinyl chloride and copolymers of vinyl chloride containing from about 1–99 weight percent of a copolymer resin resulting from the polymerization of (a) 5 to 95 percent by weight of an adduct of hexachlorocyclopentadiene and a cyclic olefin with two or more double bonds, with (b) 95 to 5 percent by weight cyclic olefins.

2. Film, sheet, and molded articles made of the resin-copolymer modifier blend of claim 1.

3. The resin-copolymer modifier blend of claim 1 wherein the copolymer is prepared of at least one cyclic olefin and the adduct of hexachlorocyclopentadiene and 1,5-cyclooctadiene.

4. Film, sheet and molded articles of claim 3.

5. The resin-copolymer modifier blend of claim 3 wherein the cyclic olefin is selected from the group consisting of cyclopentene, cyclooctene, cyclododecene, 1,5-cyclooctadiene and 1,5,9-cyclododecatriene.

6. Film, sheet, molding articles of claim 5.

7. The resin-copolymer modifier blend of claim 3 wherein the adduct produces in the copolymer the repeating unit having the following structural formula:

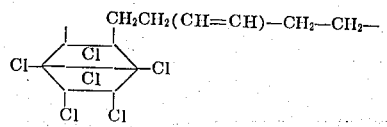

8. Film, sheet and molded articles made of resin-copolymer modifier blend of claim 7.

9. A rigid PVC film comprising of the resin-copolymer modifier blend of claim 7 wherein the impact and tear resistance of PVC is improved without affecting the haze properties when using 1 to 20 percent by weight of copolymer resin resulting from polymerization of comonomers (A) and (B).

10. A flexible, tough, low extractable PVC film comprising of the resin-copolymer modifier blend of claim 7 wherein the impact rupture and tear resistance of PVC is improved and the resultant films are of low extractability when using 1 to 50 percent by weight of copolymer resin resulting from polymerization of comonomers (A) and (B).

11. Molded articles of the resin-copolymer modifier blend of claim 7.

* * * * *